Aug. 7, 1956  S. AUKEMA  2,757,720
AXIAL PRESSURE TYPE SELF-CENTERING TIRE REMOVING DEVICE
Filed Dec. 29, 1952
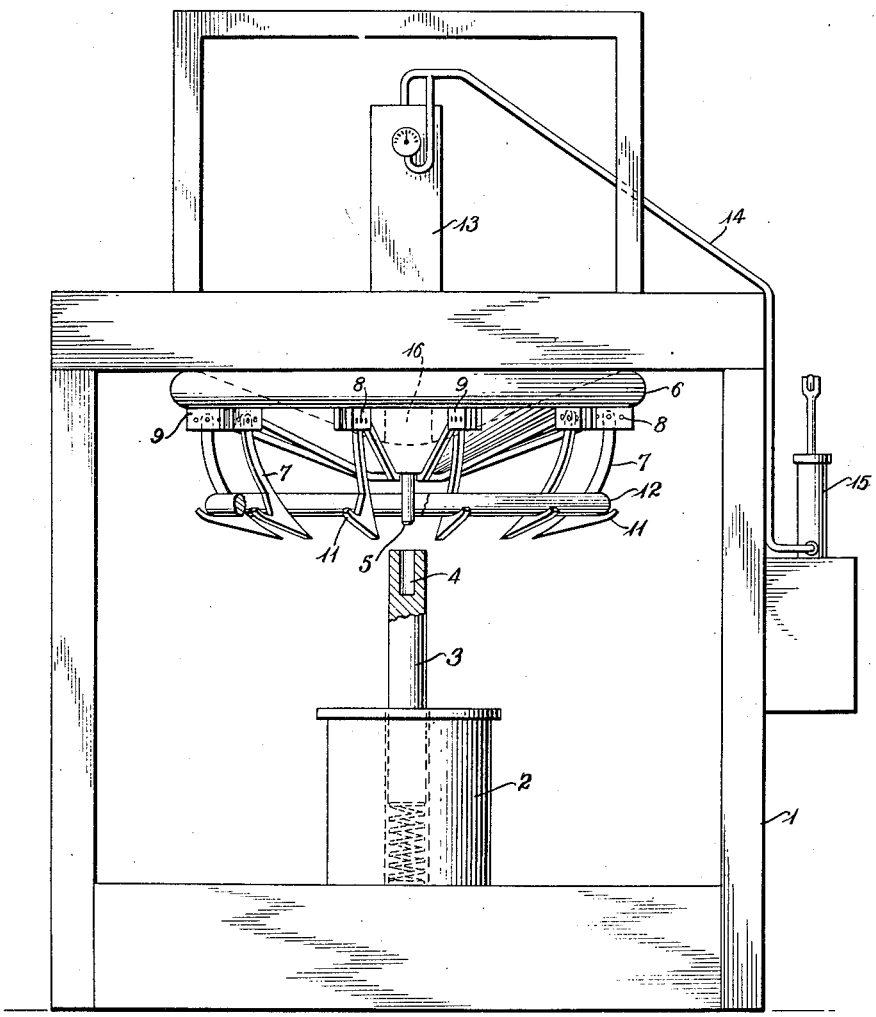
INVENTOR
*Simon Aukema*
BY *Stevens, Davis, Miller and Mosher*
ATTORNEYS

# United States Patent Office 2,757,720
Patented Aug. 7, 1956

2,757,720

AXIAL PRESSURE TYPE SELF-CENTERING TIRE REMOVING DEVICE

Simon Aukema, Heerenveen, Netherlands

Application December 29, 1952, Serial No. 328,365

Claims priority, application Netherlands January 3, 1952

1 Claim. (Cl. 157—1.2)

The invention refers to a tire removing device comprising a frame provided with a driving mechanism for operating a member having a plurality of arms hingingly secured thereto, of which arms the ends coming into contact with the tire to be removed from the rim are curved.

Such tire removing devices are known in various forms but they present the disadvantage that in moving them towards the tire to be removed the arms are not evenly displaced. In order to attain this it is necessary to beat these arms repeatedly inwards with the aid of a hammer. This entails the danger of damaging the arms as well as the tires to be removed and, moreover, it is a difficult job taking up much time and requiring a constant attention from the attendants.

The tire removing device according to the present invention avoids these disadvantages in that the arms are provided with projections shaped so that these can carry a centring ring. In this way one achieves with certainty that the arms always move inwards evenly so that for this purpose it is not necessary to do additional work and consequently the tires can be quickly removed by one single man.

A still more reliable operation of the tire removing device is attained according to the invention if a guide is provided for the centring ring, which guide comprises a guide pin secured to the supporting member for the member provided with the hinging arms, said guide pin fitting into a hole of a fixed support or vice versa. In this way it is achieved with certainty that the ring is always concentrically guided with respect to the guide pin.

The invention will be explained below with the aid of the drawing in which by way of example an embodiment of a tire removing device according to the present invention is diagrammatically shown partly in front view and partly in longitudinal section.

The device shown in the drawing comprises a frame 1 on which a support 2 for a motor car wheel has been provided in which support a spring loaded cylindrical part 3 projecting from the support has been movably mounted.

The part 3 has an axial cavity 4 in its upper free end for receiving the guide pin 5 which is secured to a disc-shaped member 6 carrying a plurality of arms 7 hingingly connected thereto. The guide pin has a tapering free end which guides the pin into the cavity, the guide pin serving to prevent lateral displacement of the part 3 relative to the member 6. The member 6 is rigidly secured to the ram 16. The hinging point of these arms is adjustable in that for each of these arms a number of holes 8 have been provided in projections 9 of the disc-shaped member 6. Said holes being adapted to receive a detachable pin serving as a pivot for such an arm.

Each of the arms 7 presents at its lower end an outwardly projecting part 11 on which a ring 12 rests. These projections are shaped so that the ring 12 can drop off as soon as the arms have moved inwards sufficiently far during the downward movement of the disc-shaped member 6. It will be understood that if the ring 12 moves the arms 7 towards each other before the ends of the arms engage the tire to be removed, there will not be any tendency on the part of one of the arms to move further radially inwardly about its pivot since such a movement would be prevented by the action of gravity. In this respect, it will be noted that the pivoted ends of the arms are above the ring 12 and outward of the lower ends of the arms, which ends constitute the major portion of the arms. Because the arms 7 are rigid and inwardly curved and are pivotally connected to the member 6, the lower free ends of the arms must move inwardly evenly when the member 6 moves further downward. It is not possible for one arm to move radially inward at a faster rate or further than the rest of the arms because to do so, such an arm must move the member 6 so that the rest of the arms, because of the fact that they are rigid and are pivotally carried by the member 6, must also move. Such a movement of the member 6, however, is prevented by the pin 5 fitting in the hole 4 in the part 3.

The downward movement of the disc-shaped member 6 is carried out with the air of a press 13 mounted on the frame 1 which press is operated via a conduit 14 by a pressure pump 15. In this way the ram 16 of the press 13 drives the member 6 downwards.

The device as described above operates as follows:

After a wheel of which the tire has to be removed has been laid on the support 2 and the ring 12 has been pushed over the arms 7 hanging down, so that these are moved towards each other and this ring comes to rest on the projections 11 of the arms 7, the member 6 is moved downwards by means of the ram 16 of the press 13. The curved arms 7 come into engagement with the tire to be removed in such a way that their ends are concentric with the part 3. Since the ring 12 has moved the ends of the arms 7 inwardly, they will be further moved inwardly when the member 6 is moved downward. Because of the fact that the hinged or pivoted arms are rigid, their ends will be moved towards each other as the member 6 approaches the tire. Due to the action of the ring 12 the arms are brought into engagement with the tire so that their ends are concentric with the part 3. Immediately or sortly after such engagement of the ends of the arms with the tire, the ring has performed its duty. In this way the member 6 can move downwards quickly and no special supervision is required. As soon as the arms 7 have been pivoted inwards sufficiently far the guide ring 12 drops off the projections 11.

It is clear that the invention is not restricted to the embodiment described above but that it may be modified in several ways without leaving the field of the invention. It is, for instance, not essental to provide all arms 7 with a projecting part 11. The drive of the member 6 can be effected according to any known system, in a hydraulic as well as pneumatic or mechanical way. Also the member 6 and the support 2 may be executed so that these can be mounted in a vertical hydraulic workshop press etc.

I claim:

A tire removing device comprising a frame, having a driving mechanism, means underlying the driving mechanism for supporting an automobile wheel having a tire mounted thereon and to be removed therefrom, a member actuated by said driving mechanism and moved thereby toward such means, a plurality of arms pivotally secured in a circular arrangement to said member and depending therefrom, said arms having inwardly curved lower free ends for engaging on the tire, outwardly and upwardly slanting hooks extending from the arms adjacent their lower ends and a centering ring adapted to seat on said hooks for simultaneously centering said lower ends of the arms on the tire.

References Cited in the file of this patent

UNITED STATES PATENTS

| | | |
|---|---|---|
| 2,406,996 | Colley | Sept. 3, 1946 |
| 2,436,003 | Gosselin | Feb. 17, 1948 |
| 2,442,714 | Stack | June 1, 1948 |
| 2,479,432 | Tillotson | Aug. 16, 1949 |
| 2,488,539 | Holbrook | Nov. 22, 1949 |
| 2,519,114 | Compton | Aug. 15, 1950 |
| 2,618,320 | Deysher et al. | Nov. 18, 1952 |